(12) United States Patent
Klask et al.

(10) Patent No.: US 8,458,605 B2
(45) Date of Patent: Jun. 4, 2013

(54) IMAGE FILE AS CONTAINER FOR WIDGETS IN GUI AUTHORING TOOL

(75) Inventors: Kenneth J. Klask, San Jose, CA (US); Manohar Kashyap, Fremont, CA (US)

(73) Assignee: Amulet Technologies, LLC, Campbell, CA (US)

( * ) Notice: Subject to any disclaimer, the term of this patent is extended or adjusted under 35 U.S.C. 154(b) by 182 days.

(21) Appl. No.: 12/713,749

(22) Filed: Feb. 26, 2010

(65) Prior Publication Data

US 2011/0214078 A1    Sep. 1, 2011

(51) Int. Cl.
G06F 3/14    (2006.01)
G06F 3/17    (2006.01)

(52) U.S. Cl.
USPC ........... 715/763; 715/530; 715/762; 715/789; 707/4; 709/315

(58) Field of Classification Search
USPC .. 715/200–277, 530, 700–867; 700/701–866; 709/201–229; 705/50–79; 345/30–111; 348/206–231.9; 707/4, 200–206, 315
See application file for complete search history.

(56) References Cited

U.S. PATENT DOCUMENTS

| | | | |
|---|---|---|---|
| 6,469,714 B2 * | 10/2002 | Buxton et al. | 715/762 |
| 2003/0202014 A1 | 10/2003 | Wood | |
| 2004/0039848 A1 * | 2/2004 | Estrada et al. | 709/315 |
| 2004/0205644 A1 * | 10/2004 | Shaughnessy et al. | 715/530 |
| 2006/0005207 A1 | 1/2006 | Louch et al. | |
| 2006/0015818 A1 | 1/2006 | Chaudhri et al. | |
| 2007/0250492 A1 * | 10/2007 | Angel et al. | 707/4 |
| 2008/0235602 A1 | 9/2008 | Strauss et al. | |
| 2010/0138778 A1 * | 6/2010 | Dewan et al. | 715/789 |

OTHER PUBLICATIONS

International Search Report and Written Opinion, 11 pages, Jul. 5, 2011.

* cited by examiner

*Primary Examiner* — Ruay Ho
(74) *Attorney, Agent, or Firm* — David C. Hsia; Patent Law Group LLP

(57) ABSTRACT

A method for authoring a graphical user interface (GUI) includes providing a widget builder interface for editing a template widget and receiving user input of widget properties for the template widget. The widget properties including a widget type, one or more widget parameters, and one or more images. The method further includes saving the widget properties and the one or more images into a widget file conforming to a standard image file format.

21 Claims, 14 Drawing Sheets

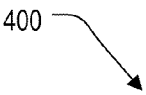

```
400

402   <?xml version="1.0" encoding="UTF-8"?>
404   <Template>
406       <RadioButton>
408           <Name Type="12" Editable="True" Optional="False" >RB1</Name>
410           <label Type="12" Editable="True" Optional="False">Button Label</label>
412           <initialCondition Type="10" Editable="True" Optional="False">Off    On
414   Off</initialCondition>
416           <groupName Type="12" Editable="True" Optional="False">rbg1</groupName>
418           <href Type="15" Editable="True" Optional="False" >Amulet:Nop</href>
420           <Width Type="13" Optional="False">162</Width>
422           <Height Type="13" Optional="False">34</Height>
424           <fontStyle Type="18" Editable="True" Optional="False">Plain        Plain      Bold
426   Italic</fontStyle>
428           <Font Type="14" Editable="True" Optional="False">BitstreamVera Sans, 12pt</Font>
430           <emptyImage Type="19" Optional="True"></emptyImage>
432           <fullImage Type="19" Optional="True"></fullImage>
434           <TrackingImage Type="19" Optional="True"></TrackingImage>
436       </RadioButton>
438   </Template>
```

FIG. 4

```
1001  <?xml version="1.0" encoding="UTF-8"?>
1002  <GEMProject GEMstudioVersion="0.2.1.x" CompilerVersion="V1.1.x">
1003      <PAGE NAME="Page_1">
1004          <PROPERTIES>
1006              <HEAD>
1007                  <TRANSITIONS>Don't Clear Previous Screen</TRANSITIONS>
1008              </HEAD>
1009          </PROPERTIES>
1010          <BKGND>
1011              <IMAGE>
1012                  <Name>fridge</Name>
1013                  <invisible Type="2" Editable="True">False    True    False</invisible>
1014                  <FILE Type="16" Editable="True">.Library\Images\Backgrounds\fridge.png</FILE>
1015                  <CACHED Type="10" Editable="True">No    Yes    No</CACHED>
1016                  <MidX Type="13">160</MidX>
1017                  <MidY Type="13">120</MidY>
1018                  <Width Type="13">326</Width>
1019                  <Height Type="13">246</Height>
1020              </IMAGE>
1021          </BKGND>
1022          <BODY>
1023              <RadioButton imageSource=".Library\Controls\Buttons\CrushedIce.png">
1024                  <Name>CrushedIce</Name>
1025                  <invisible Type="2" Editable="True">False    True    False</invisible>
1026                  <initialCondition Type="10" Editable="True">On    On    Off    FromInitHref</InitialCondition>
1027                  <groupName Type="12" Editable="True">IceAndWater</groupName>
1028                  <href Type="15" Editable="True">Amulet:Nop</href>
1029                  <MidX Type="13">60</MidX>
1030                  <MidY Type="13">130</MidY>
1031                  <Width Type="13">94</Width>
1032                  <Height Type="13">115</Height>
1033              </RadioButton>
1034              <FunctionButton>
1035                  <Name>InvisibleButton</Name>
1036                  <invisible Type="2" Editable="True">False    True    False</invisible>
1037                  <fontStyle Type="18" Editable="True">Bold    Bold    Italic</fontStyle>
1038                  <buttonType Type="10" Editable="True">TOGGLE    Spring-Loaded    Toggle</buttonType>
```

FIG. 10A

```
1039         <onButtonPress Type="10" Editable="True">DEPRESS    Alpha    Depress Gray</onButtonPress>
1040         <href Type="15" Editable="True">Page_2</href>
1041         <fillColor Type="11">#FFFFFF00</fillColor>
1042         <borderColor Type="11">#00000000</borderColor>
1043         <label Type="12" Editable="True"/>
1044         <font Type="14" Editable="True">Bitstream Vera Sans, 12pt</font>
1045         <fontColor Type="11" Editable="True">#000000</fontColor>
1046         <MidX Type="13">259</MidX>
1047         <MidY Type="13">207</MidY>
1048         <Width Type="13">89</Width>
1049         <Height Type="13">37</Height>
1050       </FunctionButton>
1051     </BODY>
1052   </PAGE>
1053   <PAGE NAME="Page_2">
1054     <PROPERTIES>
1055       <HEAD/>
1056     </PROPERTIES>
1057     <BKGND/>
1058     <BODY>
1059       <FunctionButton>
1060         <Name>GoBackButton</Name>
1061         <invisible Type="2" Editable="True">False    True    False</invisible>
1062         <label Type="12" Editable="True">Back</label>
1063         <Font Type="14" Editable="True">Tahoma, 12pt</Font>
1064         <fontColor Type="11" Editable="True">#000000</fontColor>
1065         <fillColor Type="11" Editable="True">#316AC5FF</fillColor>
1066         <borderColor Type="11" Editable="True">#000000FF</borderColor>
1067         <href Type="15" Editable="True">Page_1</href>
1068         <MidX Type="13">160</MidX>
1069         <MidY Type="13">120</MidY>
1070         <Width Type="13">73</Width>
1071         <Height Type="13">32</Height>
1072       </FunctionButton>
1073     </BODY>
1074   </PAGE>
1075 </GEMProject>
```

FIG. 10B

```
<Template>
    <Slider>
        <Name Type="12" Editable="True" Optional="False">MySlider</Name>
        <Width Type="13" Editable="True" Optional="False">50</Width>
        <Height Type="13" Editable="True" Optional="False">50</Height>
        <channelColor Type="11" Editable="True" Optional="False">#000000</channelColor>
        <handleColor Type="11" Editable="True" Optional="False">#FF0000</handleColor>
        <handleFrameColor Type="11" Editable="True" Optional="False">#000000</handleFrameColor>
        <handleTrackingColor Type="11" Editable="True" Optional="False">#FFFF00</handleTrackingColor>
        <href Type="15" Editable="True" Optional="False">Amulet:NOP</href>
        <hrefEvent Type="10" Editable="True" Optional="False">onChange   onChange   onPenUp</hrefEvent>
        <initialCondition Type="12" Editable="True" Optional="False">hello</initialCondition>
        <max Type="13" Editable="True" Optional="False">253</max>
        <min Type="13" Editable="True" Optional="False">1</min>
        <minAt Type="10" Editable="True" Optional="False">LEFT  LEFT   RIGHT   TOP   BOTTOM</minAt>
        <tickColor Type="11" Editable="True" Optional="False">#000000</tickColor>
        <tickCount Type="13" Editable="True" Optional="False">1</tickCount>
        <handleOffset Type="13" Editable="True" Optional="True">1</handleOffset>
        <handleThickness Type="13" Editable="True" Optional="True">4</handleThickness>
        <font Type="14.0" Editable="True" Optional="False">Amulet Sans Serif</font>
        <fontSize Type="14.1" Editable="True" Optional="False">12pt</fontSize>
        <fontColor Type="11" Editable="True" Optional="False">#000000</fontColor>
        <fontStyle Type="18" Editable="True" Optional="False">PLAIN   PLAIN   BOLD   ITALIC  UNDERLINE    STRIKE</fontStyle>
        <hrefOnHitOnly Type="2" Editable="True" Optional="True">FALSE  TRUE   FALSE</hrefOnHitOnly>
        <initHref Type="15" Editable="True" Optional="True">Amulet:NOP</initHref>
        <orientation Type="10" Editable="True" Optional="True">HORIZONTAL   HORIZONTAL   VERTICAL</orientation>
        <tickLength Type="13" Editable="True" Optional="True">2</tickLength>
        <tickPosition Type="10" Editable="True" Optional="True">CENTER  CENTER   TOP    BOTTOM    LEFT    RIGHT</tickPosition>
        <waitForInit Type="2" Editable="True" Optional="True">FALSE    TRUE   FALSE</waitForInit>
        <transparency Type="2" Editable="True" Optional="True">FALSE    TRUE   FALSE</transparency>
        <clearFirst Type="2" Editable="True" Optional="True">FALSE    TRUE   FALSE</clearFirst>
    </Slider>
</Template>
```

FIG. 13

```xml
<?xml version="1.0" encoding="UTF-8"?>
<Template>
    <List>
        <Name Type="12" Editable="True" Optional="False">MyList</Name>
        <Width Type="13" Editable="True" Optional="False">50</Width>
        <Height Type="13" Editable="True" Optional="False">50</Height>
        <fillColor Type="11" Editable="True" Optional="False">#FFFFFF</fillColor>
        <font Type="14.0" Editable="True" Optional="False">Amulet Sans Serif</font>
        <fontColor Type="11" Editable="True" Optional="False">#000000</fontColor>
        <fontSize Type="14.1" Editable="True" Optional="False">12pt</fontSize>
        <fontStyle Type="18" Editable="True" Optional="False">PLAIN     PLAIN     BOLD     ITALIC UNDERLINE     STRIKE</fontStyle>
        <href Type="15" Editable="True" Optional="False">Amulet:NOP</href>
        <initialCondition Type="12" Editable="True" Optional="False">FromInitHref</initialCondition>
        <options Type="12" Editable="True" Optional="False">string1,string2,string3</options>
        <selectionColor Type="11" Editable="True" Optional="False">#0000FF</selectionColor>
        <selectionFontColor Type="11" Editable="True" Optional="False">#0000FF</selectionFontColor>
        <downArrow Type="19" Editable="True" Optional="True"></downArrow>
        <downArrowAlt Type="19" Editable="True" Optional="True"></downArrowAlt>
        <initHref Type="15" Editable="True" Optional="True">Amulet:NOP</initHref>
        <scrollRate Type="20" Editable="True" Optional="True"></scrollRate>
        <upArrow Type="19" Editable="True" Optional="True"></upArrow>
        <upArrowAlt Type="19" Editable="True" Optional="True"></upArrowAlt>
        <useAlphaArrow Type="2" Editable="True" Optional="True">FALSE TRUE     FALSE</useAlphaArrow>
        <alphaColor Type="11" Editable="True" Optional="True">#000000</alphaColor>
        <borderColor Type="11" Editable="True" Optional="True">#000000</borderColor>
    </List>
</Template>
```

FIG. 14

IMAGE FILE AS CONTAINER FOR WIDGETS IN GUI AUTHORING TOOL

FIELD OF INVENTION

This invention relates to graphical user interface authoring tools.

DESCRIPTION OF RELATED ART

A What-You-See-Is-What-You-Get (WYSIWYG) authoring tool for graphical user interface (GUI) offers a palette of GUI widgets that the designer can select from, visually arrange, and manipulate to assemble a GUI. The palette can either be fixed or extendible. Often, palette extensions are done by the designer using a conventional programming language such as C or Java. The palette extensions are usually intended for use by an individual customer and are not easily shared with other users of the authoring tool.

More advanced authoring environments have a plug-in architecture that allows developers to build reusable GUI widgets that can be distributed to other users so that they can add the GUI widgets to their palettes and use them just like the standard palette. GUI widgets are often a collection of source code and graphics (vector, bitmap, or both). GUI widgets are either distributed as a single file in a proprietary format or as a collection of files. When distributed as a single file, the proprietary nature of the file may prevent an operating system (OS) file explorer from providing a thumbnail of the GUI widget and a standard graphical editing tool from modifying the graphics in the file. When distributed as a collection of files, the GUI widget is difficult to manage.

BRIEF DESCRIPTION OF THE DRAWINGS

In the drawings:

FIG. 4 illustrates XML (Extensible Markup Language) properties of a radio button widget in a tEXt chunk of the PNG file of FIG. 3 in one or more embodiments of the present disclosure;

FIGS. 10A and 10B illustrate an XML project file created from user input by the GUI builder of FIG. 5 in one or more embodiments of the present disclosure;

FIG. 13 illustrates XML properties of a slider widget in one or more embodiments of the present disclosure; and FIG. 14 illustrates XML properties of a list widget in one or more embodiments of the present disclosure.

Use of the same reference numbers in different figures indicates similar or identical elements.

DETAILED DESCRIPTION

Figure 1:
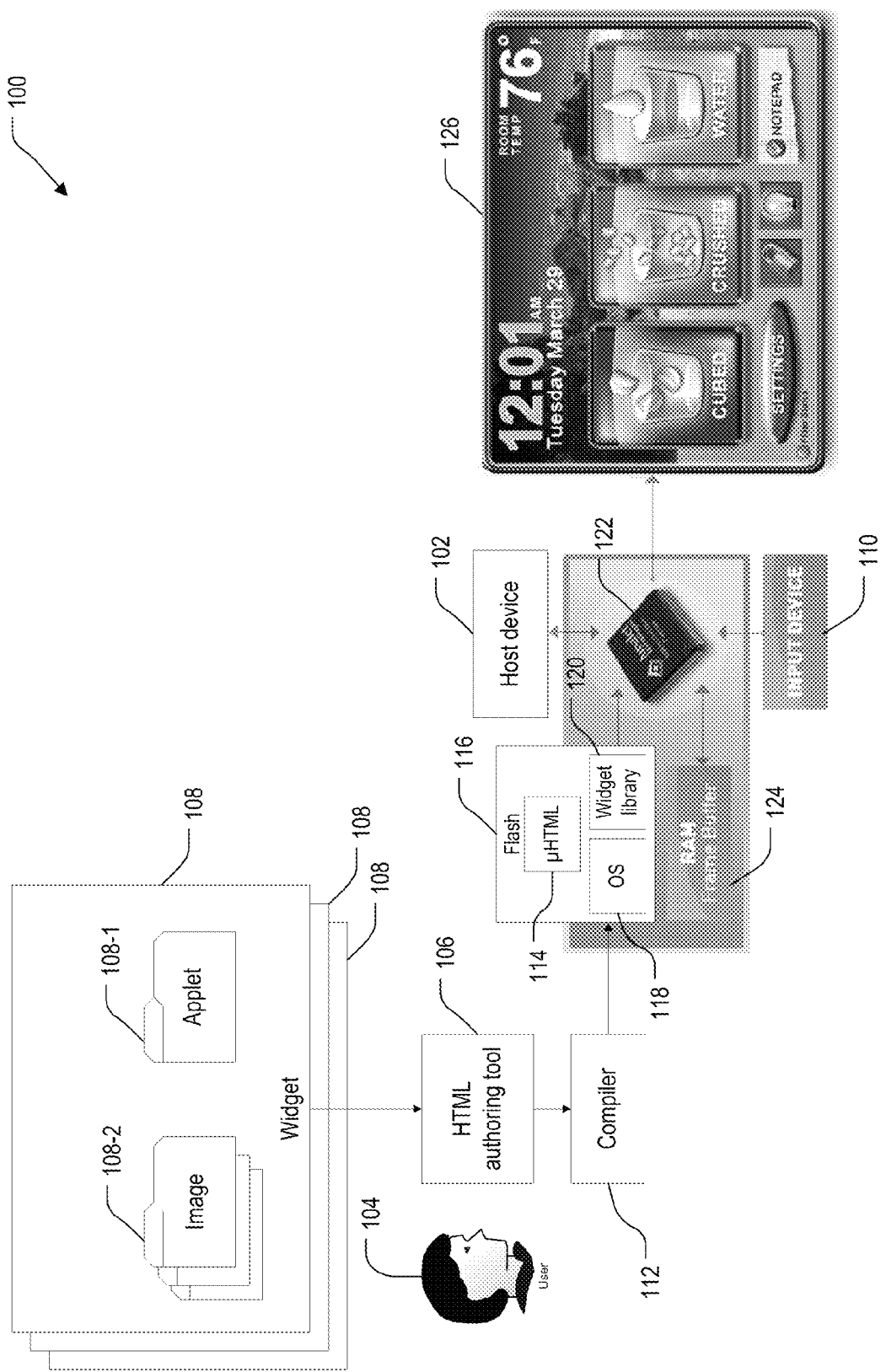
FIG. 1 illustrates a hardware-software environment for implementing a graphical user interface (GUI) for a host device.

FIG. 1 illustrates a hardware-software environment 100 for implementing a graphical user interface (GUI) for a host device 102. A user 104 uses a hypertext markup language (HTML) authoring tool 106 to design the GUI like a website by laying out text, images, animations, and hypertext links on one or more HTML pages. User 104 may add non-HTML GUI widgets to the HTML pages. The widgets are entered into the HTML pages using Java applet tags so a drag-and-drop HTML authoring tool 106 will accept widget properties nested as elements between the applet tags but the widgets are not written in Java.

The widgets in the HTML pages may be created from template widgets 108. Each template widget 108 includes an applet file 108-1 and optionally includes any number of bitmap image files 108-2 that form part of the widget. Applet file 108-1 includes the widget properties nested between applet tags. The widget properties specify a widget type, widget parameters for the widget, and one or more function calls to jump to another HTML page or for the widget to communicate data with host device 102, other widgets, or an input device 110 upon an event. The widget properties optionally include any number of properties for vector graphics that form part of the widget.

Once the GUI is constructed, user 104 runs a compiler 112 to compile the HTML pages and the linked images into μHTML code 114 to reduce size and execution requirements. User 104 loads μHTML code 114 into a nonvolatile memory 116 (e.g., a flash memory). Nonvolatile memory 116 also stores a μHTML operating system (OS) 118 and a widget library 120. A controller chip 122 includes a processor that runs μHTML OS 118, which executes μHTML code 114 to render the current GUI screen to a frame buffer in a volatile memory 124 (e.g., a random access memory). In particular, μHTML OS 118 accesses widget library 120 for the drawing methods and the behaviors of the widgets. Controller chip 122 also includes a display controller that raster scans the GUI screen in the frame buffer to a display 126. Controller chip 122 communicates user input with input device 110, such as a touch screen. Controller chip 122 also communicates data and user input with an embedded processor in host device 102.

For more details, see U.S. Pat. No. 7,100,118 and U.S. patent application Ser. No. 11/502,071, which are incorporated by reference. Controller chip 122 may be the Amulet Graphical OS Chip, and μHTML OS 118 and widget library 120 may be the Amulet OS, both available from Amulet Technologies of Campbell, Calif. The syntax of the HTML and the widget properties are found in the Programmer's Guide for the Amulet Graphical OS Chip, which is available at the website of Amulet Technologies, LLC of Campbell, Calif.

In accordance with the present disclosure, a single widget file is used as the container for all the elements of a widget. The widget file conforms to a standard image file format that allows commenting (text that is ignored by compilers and interpreters). Widget properties are stored as comments in the widget file as specified by the image file format. When vector graphics are part of the widget, their properties are stored as part of the widget properties in the comments. When bitmap images are part of the widget, they are stored as images in the widget file as specified by the image file format. The standard image format is supported by conventional operating systems so an OS file explorer can provide a thumbnail of the widget file and a standard editing tool can modify the bitmaps in the widget file. As a single file, the widget is easy to distribute between GUI developers.

Figure 2:
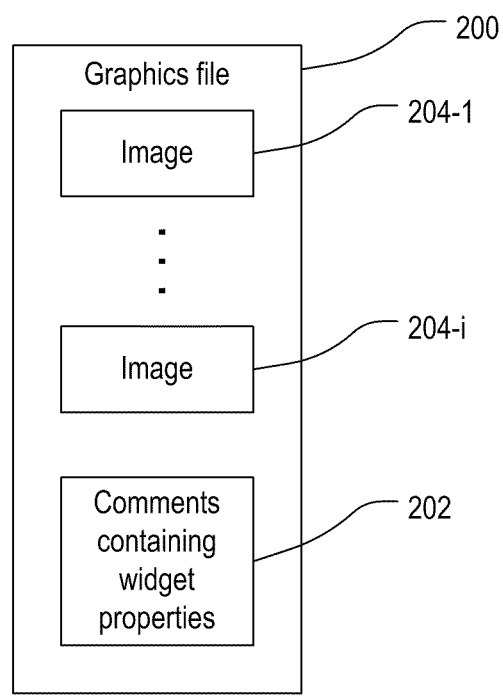
FIG. 2 illustrates a single image file of a standard format containing a widget in one or more embodiments of the present disclosure.

FIG. 2 illustrates a file 200 for a widget in one or more embodiments of the present disclosure. The widget is either a template widget or a customized widget created from a template widget. Widget file 200 conforms to a standard image file format. Widget properties are stored as comments 202 in widget file 200 as specified by the image file format. The widget properties may specify a widget type, widget parameters for the widget, and one or more function calls. Based on an event, a function call may cause a jump to another GUI page or the widget to communicate data with host device 102, other widgets, or input device 110. A widget may include any number of vector graphics and bitmap images. When vector graphics are present, their properties are stored as part of the widget properties in comments 202. When bitmap images 204-1 to 204-i are present, they are stored as images in widget file 200 as specified by the image file format. When a widget does not include any bitmap images, a representative thumbnail image may be generated and saved as an image in widget file 200 as specified by the image file format.

Figure 3:
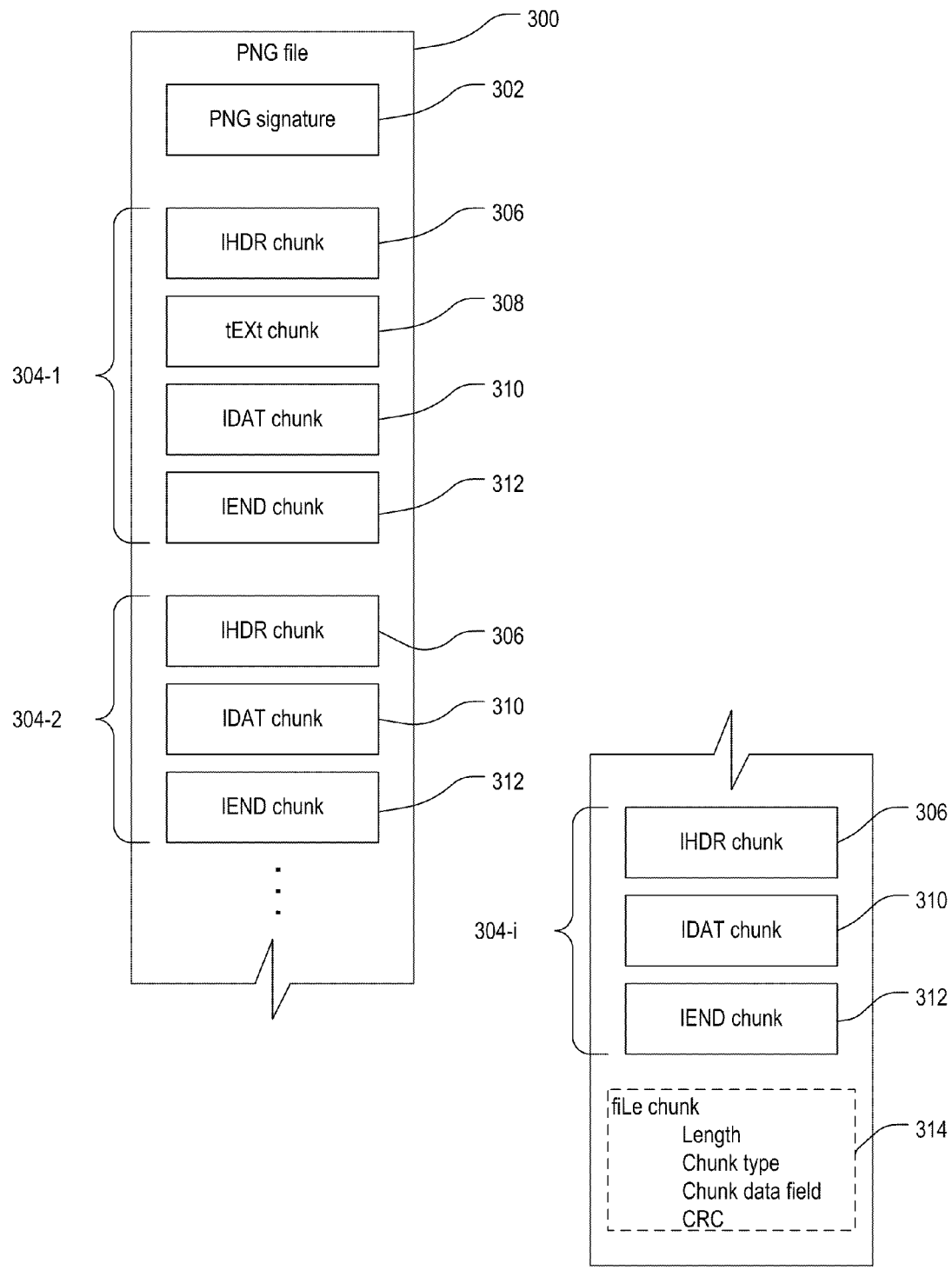
FIG. 3 illustrates an implementation of a portable network graphics (PNG) file containing a widget in one or more embodiments of the present disclosure.

FIG. 3 illustrates an implementation of a widget file 300 conforming to the portable network graphics (PNG) file format in one or more embodiments of the present disclosure. Widget file 300 includes a PNG signature chunk 302 containing a file header. PNG signature chunk 302 is followed by one or more groups of chunks. A first group 304-1 includes an IHDR chunk 306 containing an image header, a tEXt chunk 308 containing comments, an IDAT chunk 310 containing image data, and an IEND chunk 312 marking the end of the image. Widget properties are stored as comments in tEXt chunk 308. When one or more vector graphics are part of the widget, their properties are stored as part of the widget properties in tEXt chunk 308. When one or more bitmap images are part of the widget, the first bitmap image is stored in IDAT chunk 310 of first group 304-1.

First group 304-1 is optionally followed by groups 304-2 to 304-i, which each includes an IHDR chunk 306, an IDAT chunk 310, and an IEND chunk 312. When additional bitmap images are present, they are stored in IDAT chunks 310 of groups 304-2 to 304-i. When a widget does not include any bitmap image, a representative thumbnail image may be generated and saved in IDAT chunk 310 in first group 304-1. When one or more non-PNG images are present, they may be stored in one or more fiLe chunks 314, which is a new type of ancillary, private, and safe to copy chunk. The fiLe chunks 314 may also be used to store PNG images if desired. An fiLe chunk 314 has a length field, a chunk type (i.e., fiLe), the data field, and a cyclic redundancy check (CRC) calculated on the preceding bytes in the chunk but not including the length field. The data field includes a byte count of an image format description, the image format descriptor (e.g., JPEG), and the non-PNG image data.

FIG. 4 illustrates widget properties 400 implemented in XML (Extensible Markup Language) in one or more embodiments of the present disclosure. Widget properties 400 for a template radio button widget are provided as an example. Widget properties for all widget types follow the same syntax but contains information specific to the widgets. Widget properties such as widget types, widget parameters for the various widget types, and function calls for the various widget types are explained in the Programmer's Guide for the Amulet Graphical OS Chip, which is available at the website of Amulet Technologies, LLC of Campbell, Calif. For illustrative purposes, widget properties of a slider widget and a list widget are provided in the Appendix of the present disclosure. Additional widget types include a checkbox widget, a button widget, a spinner widget, and a menu widget. This is a non-exhaustive list of widget types and future widget types may be developed.

Widget properties 400 begin with a text declaration at line 402. Line 404 includes a start tag for a template element. When present, the template element identifies the widget as a template widget for creating customized widgets. Line 406 includes a start tag for a widget type element nested within the template element. The widget type is "RadioButton," which identifies the widget as a radio button widget. Nested in the widget type element are widget parameter elements for the widget.

The widget parameter elements each include start and end tags, a widget parameter name and one or more attributes in the start tag, and one or more values for the widget parameter between the tags. When a start tag includes an attribute of "Editable="True"," the widget parameter may be modified by the user when the user creates a widget from the template widget and vice versa. When a start tag includes an attribute of "Optional="False"," the widget parameter is a parameter that is automatically included in a properties editor 602 (described later with FIG. 6) in a widget builder 502 (described later with FIG. 5) when the user creates a customized widget from a template widget. When a start tag includes an attribute of "Optional="True"," the widget parameter is listed as one of the parameters in a popup menu 608 (described later with FIG. 6) used to add a widget parameter to properties editor 602. When a start tag includes an attribute of "Ignore="True"," the widget is created without a widget parameter in a GUI builder 606 (described later with FIG. 6).

Line 408 includes a "Name" element having a value that specifies a name (e.g., "RB1") for the radio button widget. Line 410 includes a "label" element having a value that specifies a label (e.g., "Button Label") appearing with the radio button widget. Lines 412 and 414 include an "initialCondition" element having values that specify an initial condition for the radio button widget when the UI is initially loaded and choices for the initial condition. For example, the values for the initialCondition element are "Off On Off," where the first "Off" specifies the set initial condition, the "On Off" thereafter specifies the choices for the initial conditions, and the values are separated by a tab delimiter (not visible in the XML text). Line 416 includes a "groupName" element having a value that specifies a group (e.g., "rbg1") that this radio button widget is part of Line 418 includes a "href" element having a value that specifies a function (e.g., a placeholder function "Amulet:Nop") to be invoked when the radio button widget is set.

Line 420 includes a "Width" element having a value that sets a width (e.g., 164 pixels) for the radio button widget. Line 422 includes a "Height" element having a value that sets a height (e.g., 34 pixels) for the radio button widget. Lines 424 and 426 include a "fontStyle" element having one or more values that specify one or more font styles (e.g., plain, bold and italic) for the label. Line 428 includes a "font" element having values that specify the font and the font size (e.g., Amulet Sans Serif, 12 pt) of the label.

Lines 430, 432, and 434 include elements that identify images to be used for the widget in various states (also referred to as "state images"). Line 430 includes an "emptyImage" element having one or more values that specify one image or multiple images (also referred to as "image components") that make up the empty state image of the radio button widget when the widget is not set. When image components are specified for a state image, the image components are layered over each other to create the state image. Line 432 includes a "fullImage" element having one or more values that specify one image or multiple image components that make up the full state image of the radio button widget when the widget is set. Line 434 includes a "TrackingImage" element having one or more values that specify one image or multiple image components that make up the tracking state image of the radio button widget when the widget is being touched in a touch screen or when a cursor is placed over the widget.

Line 436 is the end tag for the widget type "RadioButton," which has a corresponding start tag on line 406. Line 438 is the end tag for the template element "Template," which has a corresponding start tag on line 404.

Each start tag for a widget parameter element includes an attribute of "Type=" that specifies the data type of the widget parameter. A popup data type 10 is a popup menu in which the user can select only one option for a widget parameter. For example, popup data type 10 is used for the initialCondition parameter in line 412. As described above, the values for the initialCondition element are "Off On Off," where the first "Off" specifies the set initial condition, the "On Off" thereafter specifies the choices for the initial conditions, and the values are separated by tab delimiters (a nonprinting character).

A color data type 11 specifies that a widget parameter value is a color. For example, color data type 11 is used to describe widget parameters such as text color.

A string data type 12 specifies that a widget parameter value is a string value. For example, string data type 12 is used to describe widget parameters such as name and label.

A number data type 13 specifies a widget parameter value as a number. For example, number data type 13 is used to describe widget parameters such as width, height, minimum values, and maximum values.

A font data type 14 specifies a widget parameter value as a font and font size. For example, font data type 14 is used to describe widget parameters such as font type.

An IWCMethod data type 15 specifies widget parameter values as one or more functions used in a widget and one or more events that trigger the function call. Some of the functions include jumping to another GUI page, sending values out, setting values, halting current widget activity, and saving current status to memory. For example, a href element in the radio button widget may use the IWCMethod data type to toggle the polarity of a display between positive and negative.

A file data type 16 specifies a widget parameter value as a bitmap file external of the widget filet. For example, the Empty Image parameter of the radio button widget uses file data type 16 to point to a file which contains the empty state image. When the radio button widget is not set, this image will show on the GUI.

A Boolean data type 17 specifies a widget parameter value that has two choices. For example, in a line graph widget, a column clear parameter may be classified as Boolean because it has two choices: TRUE or FALSE.

A MultiSelectionPopup data type 18 has a popup menu that shows different options the user may choose. This is different than popup data type 10 because the user may select more than one option simultaneously. For this data type, the widget parameter values include the selected choices separated by "|" characters, the selected choices are separated by a tab delimiter (a nonprinting character) from the choices for the widget parameter element, and the choices are separated by tab delimiters. For example, a font element having MultiSelectionPopup data type 18 allows the user to select font size, font color, and font style at the same time.

An EmbeddedImage data type 19 specifies one or more widget parameter values as one PNG image or multiple PNG image components saved in the widget file. When multiple PNG image components are specified, the image components are grouped to form a single image. For example, image A, B, and C can be grouped as a down button image and image B, D and E can be grouped as an up button.

An UnsignedFloatingPoint type 20 specifies one or more values as unsigned floating point numbers. For example, an Update Rate widget parameter specifies how often a widget calls a href function. The first unsigned floating point number specifies the href function call frequency (specified in seconds, with a single floating-point number). The range is 0.00-655.35 where a value of 0.00 means update never. The second number specifies the delay time from when a GUI page is loaded until the first href function call (specified in seconds, with a single floating-point number). The range is 0.01-655.35. If the second number is not specified, then the delay time defaults to the first number (frequency).

An ImageArray type 21 specifies an array of images used in the widget. Images may be non-PNG. The images can be saved in the widget file or a separate file in itself.

Figure 5:
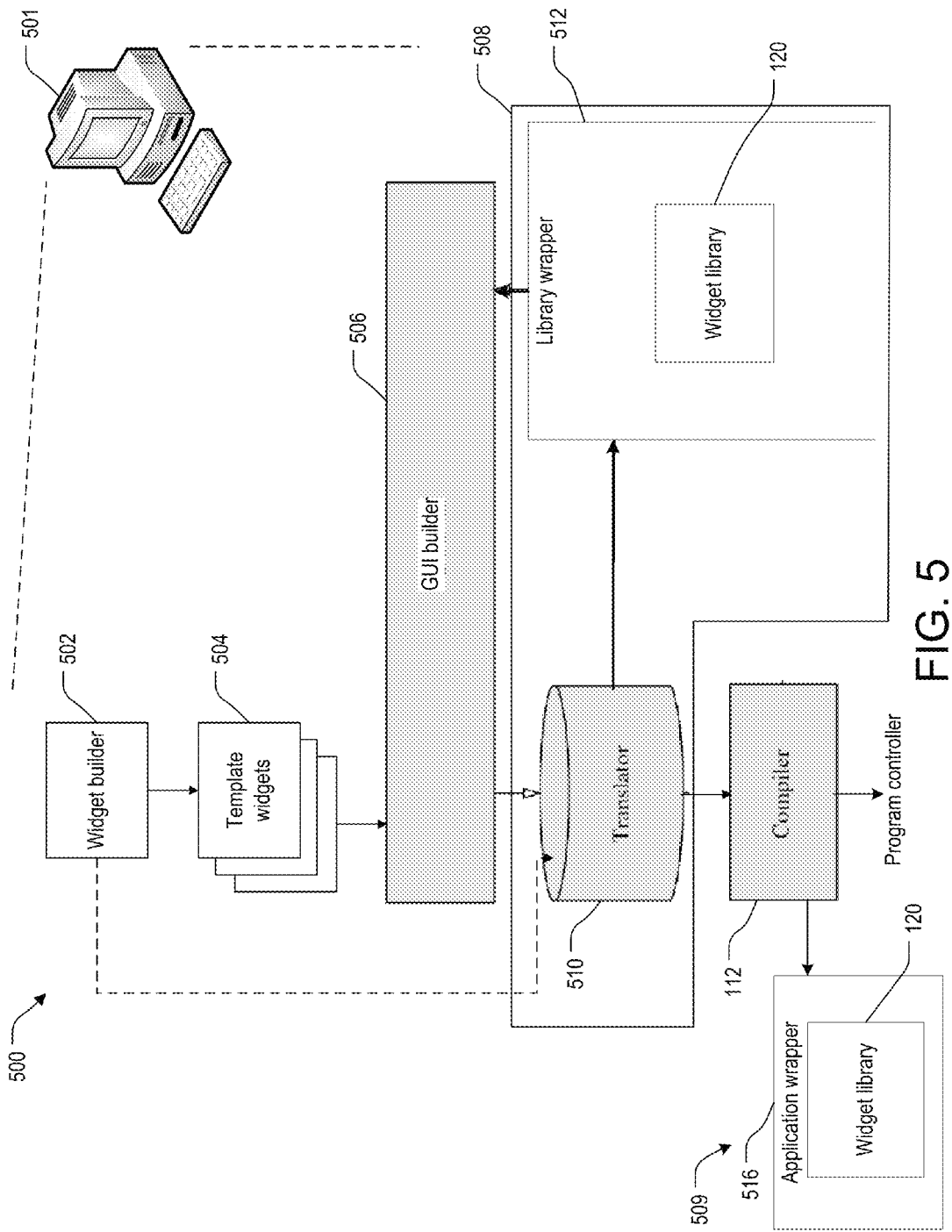
FIG. 5 illustrates a What-You-See-Is-What-You-Get (WYSIWYG) authoring tool for GUI in one or more embodiments of the present disclosure.

FIG. 5 illustrates a What-You-See-Is-What-You-Get (WYSIWYG) authoring tool 500 for GUI in one or more embodiments of the present disclosure. Authoring tool 500 is executed by a computer 501 and may be stored on a computer readable storage medium in the computer.

Authoring tool 500 includes a widget builder 502 for building widgets 504, a GUI builder 506 for building a GUI using the template widgets, a runtime rendering tool 508 for drawing GUI components, including widgets, as they would appear in a native environment with controller chip 122 (FIG. 1), compiler 112 for compiling the GUI for programming the controller chip or running on a simulator 509 of the controller chip. Widgets 504 may be template widgets or customized widgets created from the template widgets. GUI builder 506 saves the GUI in an XML project file. The XML project file includes one or more XML pages having GUI components such as texts, widgets, images, or background images. Widget builder 502 and GUI builder 506 may be part of the same software running on a non-native host environment, such as a Windows operating system executed by an x86 processor on computer 501. Widget builder 502 may also be a plug-in for a conventional graphics editor.

Runtime rendering tool 508 includes a translator 510 and a library wrapper 512 around the runtime code of widget library 120. Library wrapper 512 allows widget library 120 to run as a library on a non-native platform, such as a Windows operating system, and provides an application programming interface (API) to the widget library. Library wrapper 512 may be implemented as a dynamic link library in the Windows operating system.

To generate a widget as it would appear in a native environment with controller chip 122 (FIG. 1), GUI builder 506 outputs XML widget properties of the widget to translator 510. Translator 510 translates the XML widget properties from GUI builder 506 into data structures that can be passed to the runtime code of widget library 120 via the API defined by library wrapper 512. The runtime code of widget library 120 renders the graphic representation of each widget as described by values contained in the data structures passed by library wrapper 512. The rendered image of the widget is returned to GUI builder 506. Widget builder 502 may operate similarly to provide a view of the widget as it would appear in the native environment.

To compile the GUI for programming controller chip 122 (FIG. 1) or running on simulator 509 of the controller chip, GUI builder 506 outputs the XML project file to translator 510. Translator 510 translates the project file into an HTML document, including the applet codes for the widgets, which compiler 112 uses to generate μHTML document that can be executed by controller chip 122. The μHTML document may be programmed into controller chip 122 or ran in simulator 509 of the controller chip. Simulator 509 includes an application wrapper 516 around the runtime code of widget library 120. Application wrapper 512 allows widget library 120 to run as an application on a non-native platform, such as the Windows operating system.

Figure 6:
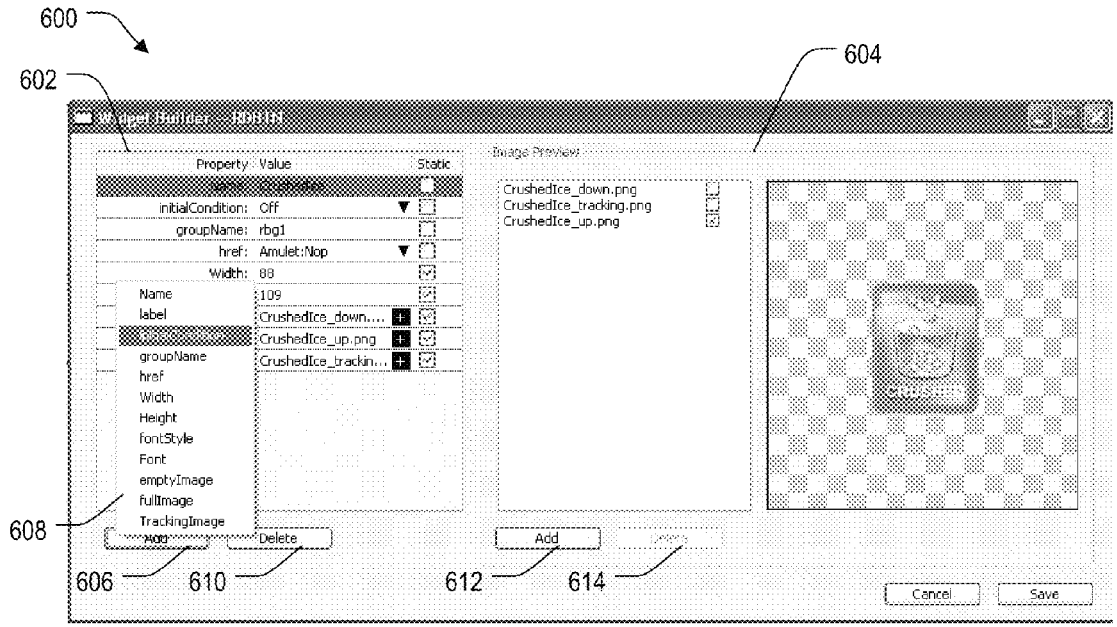
FIG. 6 illustrates a user interface for a widget builder of FIG. 5 in one or more embodiments of the present disclosure.
Figure 7:
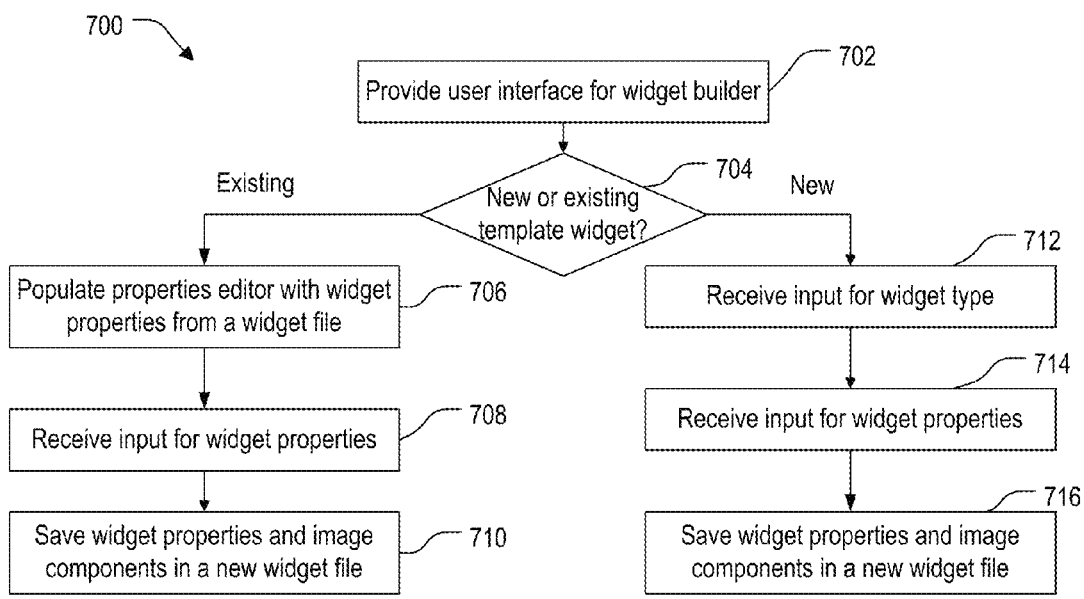
FIG. 7 is a flowchart of a method for a processor to implement the widget builder of FIG. 5 in one or more embodiments of the present disclosure.

FIG. 6 illustrates an exemplary user interface 600 of widget builder 502 (FIG. 5) in one or more embodiments of the present disclosure. FIG. 7 is a flowchart of a method 700 for a processor to implement widget builder 502 with user interface 600 (FIG. 6) in one or more embodiments of the present disclosure. Method 700 may include one or more operations, functions or actions as illustrated by one or more of blocks 702, 704, 706, 708, and 710. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

In block 702, widget builder 502 (FIG. 5) provides user interface 600 (FIG. 6) for the user to create a customized widget from a template widget or create a new template widget. Template widgets are used in GUI builder 506 (FIG. 5) to create widgets in a GUI.

In block 704, widget builder 502 (FIG. 5) determines if the user wishes to create a customized widget from a template widget or create a new template widget. The user wishes to create a customized widget from a template widget when the user opens an existing template widget file by double-clicking the template widget file, by dragging-and-dropping the widget file into user interface 600 (FIG. 6) or a user interface 800 (FIG. 8) for a GUI builder 506 (FIG. 5), by selecting the widget file through a file menu in user interface 600 (not shown) or user interface 800. If so, block 704 is followed by block 706. The user wishes to create a new template widget when the user selects to create a new template widget through the file menu. If so, block 704 is followed by block 712.

In block 706, widget builder 502 (FIG. 5) populates a properties editor 602 (FIG. 6) with widget properties from the existing template widget file. Referring to FIG. 6, properties editor 602 includes a property column for the widget parameter names, a value column for the widget parameter values, and a "static" column for making widget parameter values user-editable or not in GUI builder 506 (FIG. 5). An image preview window 604 may provide a list of images that may be previewed and a preview panel of a selected image in the list. To add an image to the preview list, the user selects an add button 612 to select the image. To view an image in the preview list, the user selects a corresponding check box next the image in the preview list and the image is displayed in the preview panel. To delete an image from the preview list, the user selects a delete button 614. Alternatively image preview window 604 provides a preview of a default state image or a selected state image from properties editor 602. Block 706 is followed by block 708.

Referring to FIG. 7, in block 708, widget builder 502 (FIG. 5) receives user input for the widget properties. Referring to FIG. 6, to add an additional widget parameter, the user selects an add button 606 to bring up a popup menu 608 of appropriate widget parameters for the widget type. As described before, widget parameter automatically appears in properties editor 602 when it is not optional and it appears in popup menu 608 when it is optional. To edit a widget parameter, the user selects the widget parameter and enters one or more value or selects one or more values from a popup menu. The user may make a widget parameter non-editable in GUI builder 506 (FIG. 5) by checking the static box for the widget parameter. To delete a widget parameter, the user selects the widget parameter and then a delete button 610. The user provides default values for non-editable widget parameters and optionally provides default values for user-editable widget parameters. Any widget parameter that is not provided by the user receives default values predetermined for the widget type.

To select a state image, the user selects the "+" box in the value column of the state image to bring up a file explorer and selects an image or multiple image components as the state image. When multiple image components are selected, they are superimposed over each other to form the state image. Alternatively the user may drag-and-drop one image or multiple image components from the preview list in image preview window 604 into the + box to form the state image. Block 708 is followed by block 710.

Referring to FIG. 7, in block 710, widget builder 502 (FIG. 5) saves the widget properties and any embedded images in a customized widget file as described above regarding FIGS. 2 and 3. The widget properties of the customized widget follow the XML syntax of the template widget as described above regarding FIG. 4 but without the template element. Depending on the widget type, widget builder 502 may include properties for vector graphics in the widget properties. When the template widget does not include any bitmap image, widget builder 502 may generate a representative thumbnail image and save it in the widget file. The customized widget file and any external image files may be saved with other customized widget files in a widget folder known to GUI builder 506 (FIG. 5).

In block 712, widget builder 502 (FIG. 5) receives user input of the widget type for the new template widget. Widget builder 502 may generate a popup menu from which the user selects a widget type. Block 712 is followed by block 714.

In block 714, widget builder 502 (FIG. 5) receives user input for the widget properties. Block 714 is similar to block 708. Depending on the widget type, some widget parameters are optional and some are not optional. Block 714 is followed by block 716.

In block 716, widget builder 502 (FIG. 5) saves the widget properties in a new template widget file as described above regarding FIGS. 2 and 3. The widget properties of the customized widget follow the XML syntax of the template widget as described above regarding FIG. 4. The above described blocks of method 700 may be repeated to create additional customized and template widgets.

Figure 8:
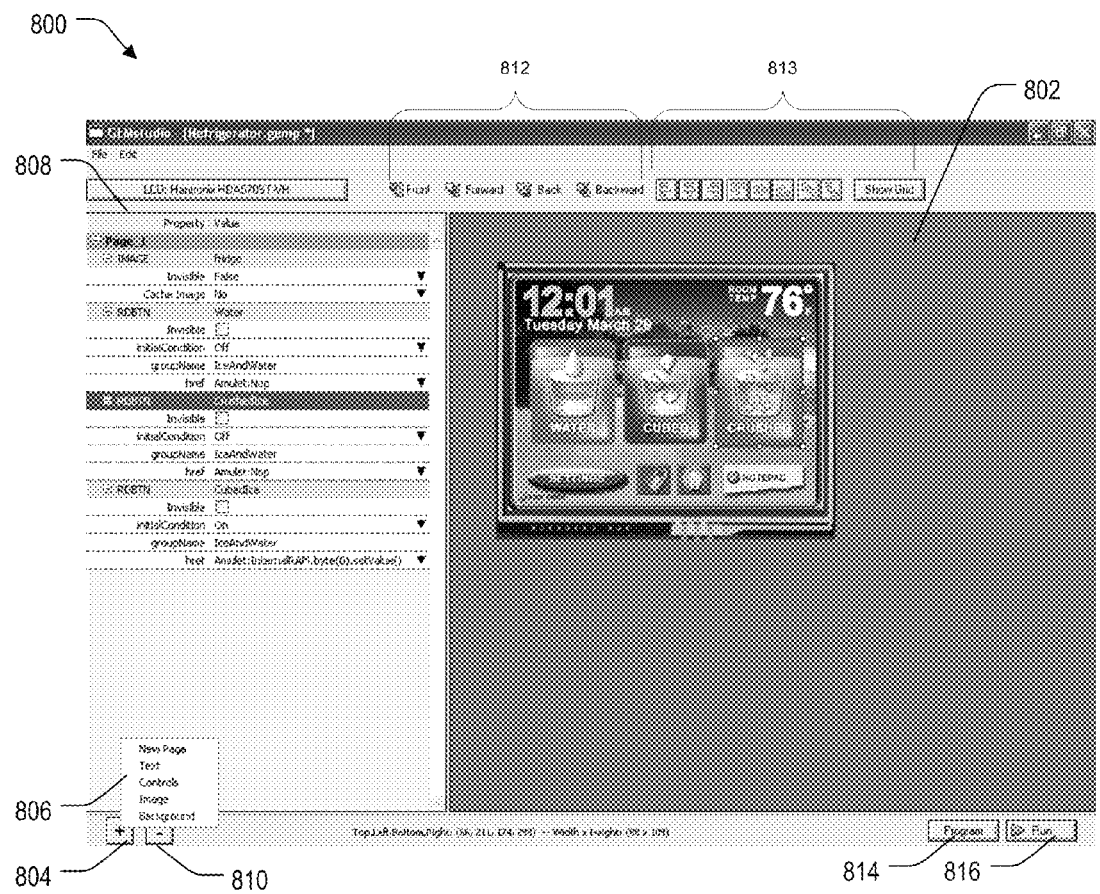
FIG. 8 illustrates a user interface for a GUI builder of FIG. 5 in one or more embodiments of the present disclosure.
Figure 9:
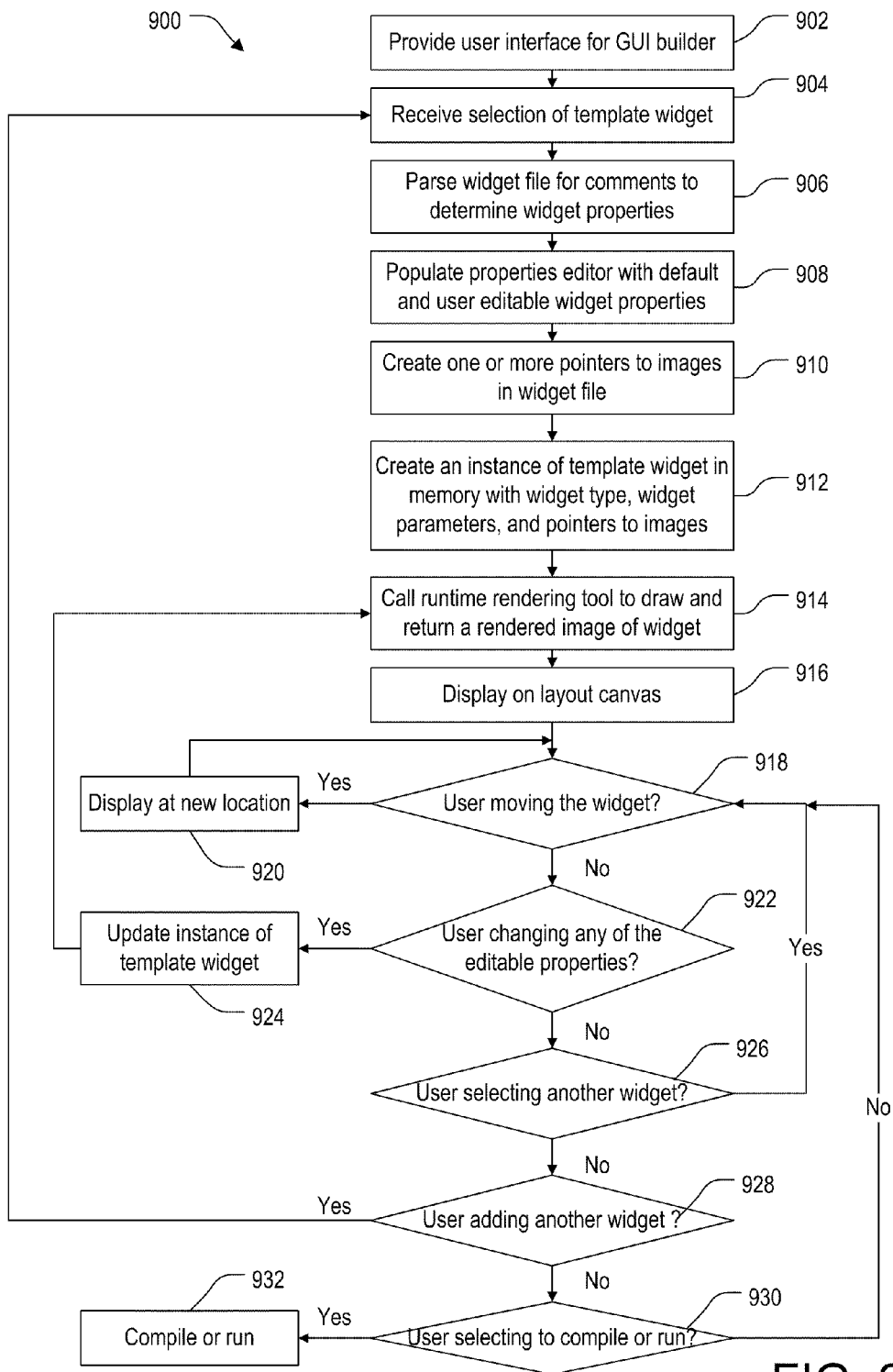
FIG. 9 is a flowchart of a method for a processor to implement the GUI builder of FIG. 5 in one or more embodiments of the present disclosure.

FIG. 8 illustrates an exemplary screenshot of a user interface 800 of GUI builder 506 (FIG. 5) in one or more embodiments of the present disclosure. FIG. 9 is a flowchart of a method 900 for a processor to implement GUI builder 506 with interface 800 in one or more embodiments of the present disclosure. Method 900 may include one or more operations, functions or actions as illustrated by one or more of blocks 902, 904, 906, 908, 910, 912, 914, 916, 918, 918, 920, 922, 924, 926, 928, 930, and 932. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

In step 902, GUI builder 506 (FIG. 5) provides user interface 800 (FIG. 8) for the user to build a GUI. Referring to FIG. 8, user interface 800 allows the user start a new GUI page or to add/delete GUI components including text, widget, image, and background image to/from a layout canvas 802 of the current GUI page. In response to the user selecting an add button 804, GUI builder 506 provides a popup menu 806 for the user to add a GUI page, a text, a widget (listed as "controls"), an image, or a background image. The GUI components are listed in a properties editor 808 with their property names and values. User deletes a GUI component by selecting the GUI component from properties editor 808 and then a delete button 810. Once the user adds a GUI component, the user may arrange it in layout canvas 802 and edit its properties in properties editor 808. GUI builder 506 saves the GUI component as part of the GUI in an XML project file 1000 (FIGS. 10A and 10B). XML project file 1000 includes one or more XML pages with XML code for the GUI components. The widgets generally follow the XML syntax of the customized widgets. Referring to FIG. 9, step 902 is followed by step 904.

In step 904, GUI builder 506 (FIG. 5) receives user input to add a widget, which is an instance of a customized widget. The user may create a widget by selecting "controls" in popup menu 806 (FIG. 8), which brings up a file explorer for selecting a customized widget file. The user may also drag-and-drop a customized widget file into layout canvas 802 (FIG. 8) or right-click another widget on the layout canvas and selecting a duplicate option. When a template widget file is opened in GUI builder 506, widget builder 502 is started to create a customized widget from the template widget. Step 904 is followed by step 906.

In step 906, GUI builder 506 (FIG. 5) parses the selected customized widget file for the comments to extract the widget properties. Step 906 is followed by step 908.

In step 908, GUI builder 506 (FIG. 5) populates properties editor 806 (FIG. 8) with the user editable parameter names and their values of the selected customized widget. Properties editor 806 includes a property column for the widget parameter names and a value column for the widget parameter values in an expandable file structure. Step 908 is followed by step 910.

In step 910, GUI builder 506 (FIG. 5) converts the images of the customized widgets, which may be in different image formats, into objects of a common class and creates pointers to the image objects. Step 910 is followed by step 912.

In step 912, GUI builder 506 (FIG. 5) creates an instance of the customized widget in memory with the widget type, the widget parameters, and the pointers to the image objects in memory. Step 912 is followed by step 914.

In step 914, GUI builder 506 (FIG. 5) calls runtime rendering tool 508 (FIG. 5) to draw and return a rendered image of the widget. GUI builder 506 provides runtime rendering tool 508 with the XML widget properties and pointers to the image objects.

Referring to FIG. 5, runtime rendering tool 508 includes translator 510 and a library wrapper 512 around the runtime code of widget library 120. Using the pointers to the image objects, translator 510 determines the size of the state image of the widget in its initial condition (default state image), and then translates the XML widget properties and the size of the default state image into data structures that can be passed to the runtime code of widget library 120 via the API defined by library wrapper 512. The runtime code of widget library 120 renders the graphic representation of the widget as described by the values contained in the data structures passed by the library wrapper 512. The rendered image of the widget is returned to GUI builder 506. Note that the runtime code of widget library 120 may not need to render a bitmap default state image since it is a bitmap. Instead, the runtime code of widget library 120 returns the appropriate size and the location of the default state image relative to the other graphical elements rendered by the widget library, and GUI builder 506 constructs the final image of the widget accordingly. Alternatively, the runtime code of widget library 120 may read the default state image and construct the final image of the widget in its entirety. Step 914 is followed by step 916.

Referring back to FIG. 9, in step 916, GUI builder 506 (FIG. 5) displays the final image of the widget on layout canvas 802 (FIG. 8). GUI builder 506 tracks the layering of the various GUI components so that it knows if the widget is displayed in front or behind other GUI components. The user may adjust the layering of the GUI components using buttons 812. The user may also adjust the alignment of the GUI components using buttons 813. Step 916 is followed by step 918.

In step 918, GUI builder 506 (FIG. 5) determines if the user is repositioning the widget on layout canvas 802 (FIG. 8) or resizing the widget. If so, step 918 is followed by step 920. Otherwise step 918 is followed by step 922.

In step 920, GUI builder 506 (FIG. 5) displays the rendered image of the widget at a new location on layout canvas 904 or at a new size according to user input. Step 920 loops back to step 918.

In step 922, GUI builder 506 (FIG. 5) determines if the user is changing an editable widget property. To edit a widget property, the user selects the widget property and enters one or more value or selects one or more values from a popup menu. When the user is changing an editable widget property, step 922 is followed by step 924. Otherwise step 922 is followed by step 926.

In step 924, GUI builder 506 (FIG. 5) updates the instance of the widget template in memory with changes made by the user. Step 924 is followed by step 914, where GUI builder 506 calls runtime rendering tool 508 (FIG. 5) to redraw and return a new rendered image of the widget based on the changes made by the user. Note that the rendered image of the widget is updated in real-time as the user makes changes (e.g., as the user changes a property).

In step 926, GUI builder 506 (FIG. 5) determines if the user is selecting another widget in layout canvas 802 (FIG. 8). If so, step 926 is followed by step 918. Otherwise step 926 is followed by step 928.

In step 928, GUI builder 506 (FIG. 5) determines if the user wishes to add another widget. If so, step 928 is followed by step 904. Otherwise step 928 is followed by step 930.

In step 930, GUI builder 506 (FIG. 5) determines if the user wishes to compile or run the GUI. The user may compile or run the GUI by selecting a program button 814 or a run button 816 (FIG. 8). If so, step 930 is followed by step 932. Otherwise step 930 is followed by step 918 where GUI builder 506 continues to monitor for user input modifying the GUI. Steps 904 to 928 may be repeated for additional GUI pages. The process for adding texts, images, and background images are not described as they are similar to authoring an HTML page.

In step 932, GUI builder 506 (FIG. 5) outputs the XML project file of the GUI to translator 510 (FIG. 5), which outputs an HTML document to compiler 112, which generate the μHTML code for programming controller chip 122 (FIG. 2) or running in simulator 509 (FIG. 5) of the controller chip FIGS. 10A and 10B illustrate an XML project file 1000 created with GUI builder 506 (FIG. 5) in one or more embodiments of the present disclosure. XML project file 1000 begins with a text declaration at line 1001. Line 1002 includes a start tag for a project element having attributes that identify GUI builder and compiler versions. Nested in the project file element are GUI page elements, and nested in the GUI page elements are GUI component elements. Although not shown, hardware elements may be included to specify the hardware parameters for the GUI (e.g., type and size of display).

Line 1003 includes a start tag for a GUI page element having a "NAME" attribute of "Page_1." Lines 1004 to 1009 include overall properties for the GUI page, such as transition effects for the GUI page. Lines 1010 to 1021 include properties for a background image. Specifically, line 1014 shows the path to a background image file "fringe.png," and line 1015 shows that the image is not to be cached in volatile memory (e.g., RAM 124 in FIG. 1) but read from nonvolatile memory (e.g., flash 116 in FIG. 1).

Figure 11:
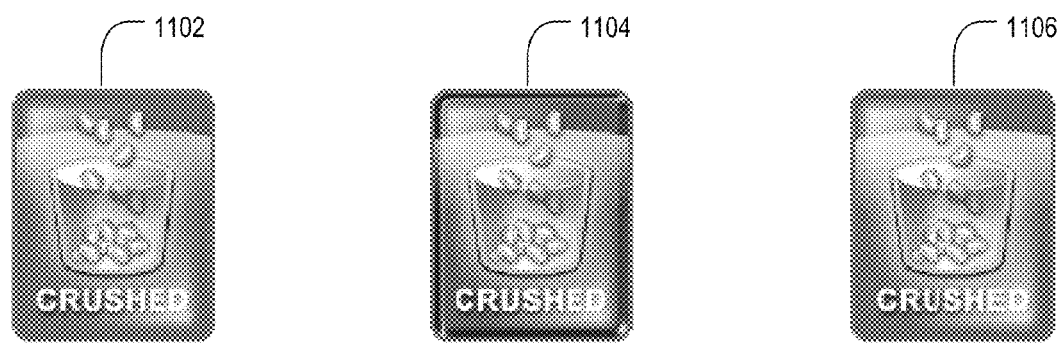
FIG. 11 illustrates state images in a customized widget file specified in the XML project file of FIGS. 10A and 10B in one or more embodiments of the present disclosure.

Lines 1022 to 1051 include properties for the body of the GUI page. Lines 1023 to 1033 include properties for a radio button widget. The start tag of the radio button widget includes an "imageSource" attribute with the path to the customized widget file. State images are not listed in these lines because they are specified in the customized widget file. FIG. 11 shows state images 1102, 1104, and 1006 in the customized widget file in one or more embodiments of the present disclosure.

Referring back to FIGS. 10A and 10B, lines 1034 to 1050 include properties for a function button widget. The start tag of the function button does not include an "imageSource" attribute because it is a standard widget having its entire graphics, either bitmap or vector, provided in widget library 120. Line 1040 includes a function call to jump to a GUI page named "Page_2" when the function button is set.

Line 1051 includes an end tag of the GUI page "Page_1." Line 1052 is the start tag of GUI page "Page_2." Lines 1053 to 1073 include the GUI components on the GUI page. Line 1074 includes an end tag of the GUI page followed by line 1075 with an end tag of the project.

Figure 12:
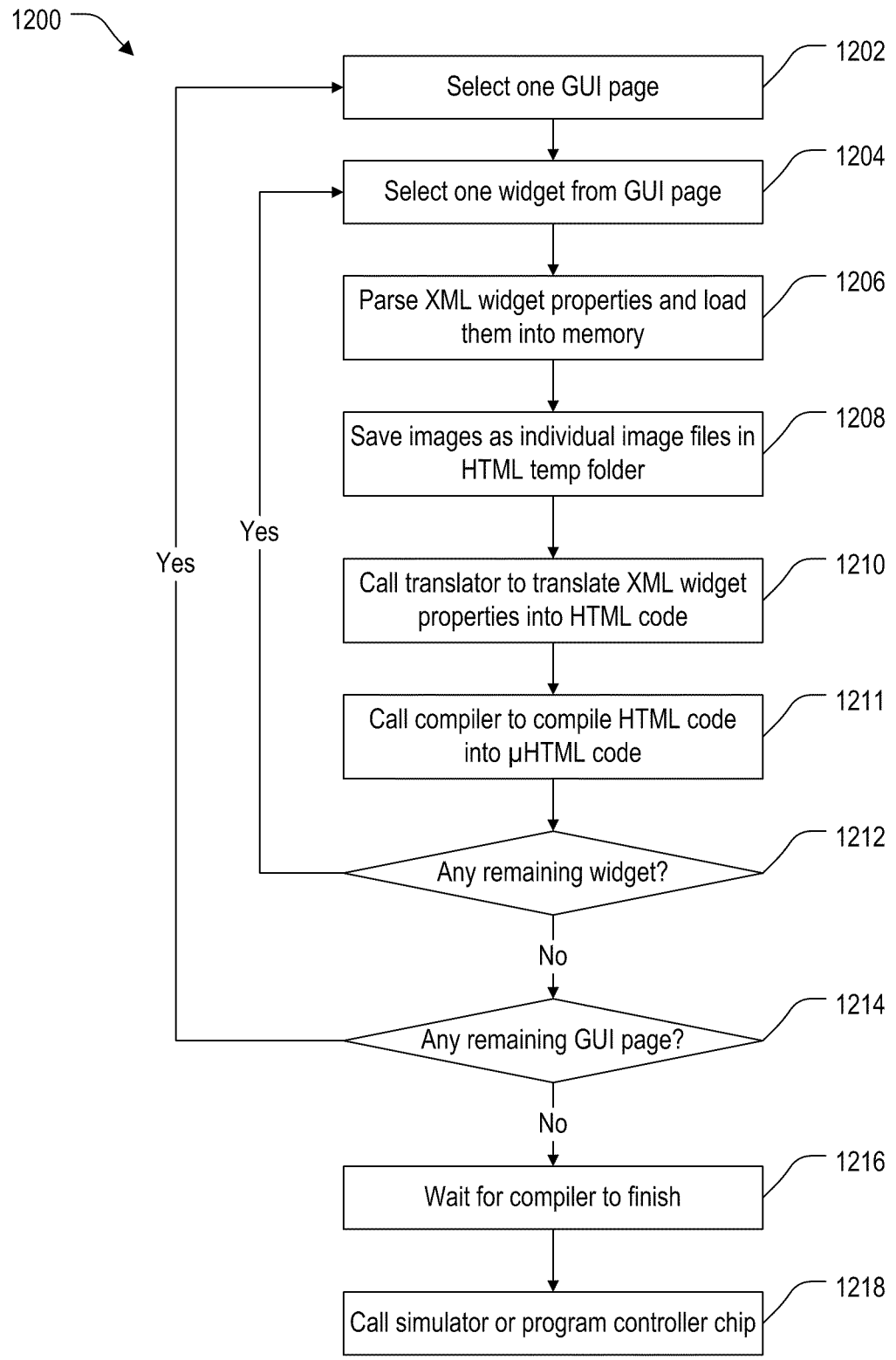
FIG. 12 is a flowchart of a method for the GUI builder of FIG. 5 to program a GUI into a controller chip of FIG. 1 or run the GUI in a simulator of the controller chip in one or more embodiments of the present disclosure.

FIG. 12 is a flowchart of a method 1200 for GUI editor 506 (FIG. 5) to output the XML project file of the GUI in step 932 (FIG. 9) in one or more embodiments of the present disclosure. Method 1200 may include one or more operations, functions or actions as illustrated by one or more of blocks 1202, 1204, 1206, 1208, 1210, 1212, 1214, and 1216. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

In step 1202, GUI editor 506 (FIG. 5) selects one of the one or more GUI XML pages from the project file. Step 1202 is followed by step 1204.

In step 1204, GUI editor 506 (FIG. 5) selects one of the one or more widgets on the GUI XML page. Step 1204 is followed by 1206.

In step 1206, GUI editor 506 (FIG. 5) parses widget properties of the widget from the XML page and loads them into memory. Step 1206 is followed by step 1208.

In step 1208, GUI editor 506 (FIG. 5) extracts any embedded images and retrieves any external images of the widget and saves them as individual image files in a HTML temporary folder. Step 1208 is followed by step 1210.

In step 1210, GUI editor 506 (FIG. 5) calls translator 510 (FIG. 5) to translate the widget properties into the HTML syntax understood by compiler 112 (FIG. 1). Step 1210 is followed by step 1211.

In step 1211, GUI editor 506 (FIG. 5) calls compiler 112 (FIG. 5) to compile the HTML code into μHTML code. Block 1211 is followed by block 1212.

In step 1212, GUI editor 506 (FIG. 5) determines if there is any remaining widget on the current GUI screen it has not processed. If so, step 1212 is followed by step 1204. Otherwise step 1212 is followed by step 1214.

In step 1214, GUI editor 506 (FIG. 5) determines if there is any remaining GUI page it has not processed. If so, step 1214 is followed by step 1202. Otherwise step 1214 is followed by step 1216.

In block 1216, GUI editor 506 (FIG. 5) waits for compiler 112 (FIG. 5) to finish compiling. Block 1216 is followed by block 1218.

In block 1218, GUI editor 506 (FIG. 5) programs controller chip 122 (FIG. 1) with the μHTML or calls simulator 509 of the controller chip to run the μHTML code.

Various other adaptations and combinations of features of the embodiments disclosed are within the scope of the invention. Instead of a PNG file, a graphics interchange format (GIF) file may be used to container for the widget. In the GIF file, the image components are saved in graphic rendering blocks and the widget source code is saved as comments in a comment extension block. Numerous embodiments are encompassed by the following claims.

APPENDIX

Slider Parameter Types

FIG. 13 lists the parameters that describe the Slide widget in one or more embodiments of the present disclosure.

Name

VALUE="text"—Specifies the name Slider widget.

Width

VALUE="number"—Specifies the width of the Slider widget.

Height

VALUE="number"—Specifies the height of the Slider widget.

channelColor

VALUE="color"—Specifies the color of the channel the handle slides along If no channel color is specified, the default color is black.

handleColor

VALUE="color"—Specifies the color inside of the handle. If no handle color is specified, the default color is white.

handleFrameColor

VALUE="color"—Specifies the color of the handle frame. If no handle frame color is specified, the default color is black.

handleTrackingColor

VALUE="color"—Specifies the color of the handle when being touched. If no handle frame color is specified, the default color is black.

Href
VALUE="function(s)"—The function (or multiple/sequenced functions) invoked upon the event specified in hrefEvent.
hrefEvent
VALUE="onChange"|"onPenUp"—The event which triggers the launching of the href function. If set to onChange, the slider will launch the function call whenever the handle is moved. If set to onPenUp, the slider will only launch the function call upon the releasing of the slider handle. If hrefEvent is not specified, the default is onChange.
initialCondition
VALUE="number"|"FromInitHref"—Specifies handle position when the page is loaded. The position value becomes the argument given to the href function(s). If FromInitHref is selected, the function specified by the InitHref attribute is called. The returned value determines the handle position. The range is 0-65535 (0x00-0xFFFF).
max
VALUE="number"—The maximum value used as the argument given to the function(s) specified in href. Maximum value is achieved when handle is full-right on a horizontal slider, or full-top on a vertical slider. The range is 1-65535 (0x01-0xFFFF).
min
VALUE="number"—The minimum value used as the argument given to the function(s) specified in href. Minimum value is achieved when handle is full-left on a horizontal slider, or full-bottom on a vertical slider. The range is 0-65534 (0x00-0xFFFE).
minAt
VALUE="LEFT"|"RIGHT"|"TOP"|"BOTTOM"—Determines where the minimum value of the slider is located. As the handle sweeps from the minAt location, the value increases until the maximum value is reached at the opposite extreme of the minAt location. Default values are LEFT for horizontal sliders and BOTTOM for vertical sliders. The options are:
  LEFT—The slider value increases from left to right. (horizontal slider only)
  RIGHT—The slider value increases from right to left. (horizontal slider only)
  TOP—The slider value increases from top to bottom. (vertical slider only)
  BOTTOM—The slider value increases from bottom to top. (vertical slider only)
tickColor
VALUE="color"—Specifies the color of the ticks drawn on the channel. If no tick color is specified, the default color is black.
tickCount
VALUE="number"|"NONE"|"AUTO"—The total number of tick marks along the slider channel. If NONE, no tick marks are visible. If AUTO, the number of tick marks is derived from the min and max values. If tickCount is not given, the default is NONE. The range is 0-255 (0x00-0xFF).
handleOffset
VALUE="number"—Specifies the number of pixels from the center of the channel the handle is located. If a vertical slider, positive numbers shift the handle to the right and negative numbers shift it to the left. If a horizontal slider, positive numbers shift the handle to the bottom and negative numbers shift it to the top. The range is −100 through 100.
handleThickness
VALUE="number"—The width (in pixels) of the handle if a horizontal slider, or the height of the handle if a vertical slider. If handleThickness is not given, the default is 11 pixels. The range is 4-255 (0x04-0xFF).
hrefOnHitOnly
VALUE="TRUE"|"FALSE"—Specifies if the slider href function(s) is launched only upon a "hit" or not. By default, hrefOnHitOnly is false, which means the slider will launch its href upon loading the page. The href is also launched after a forceUpdate( ) call. By setting hrefOnHitOnly to true, the href will only be launched upon the slider physically being selected or upon a forceHit( ) call.
initHref
VALUE="function"—Only valid if FromInitHref is used as the initialCondition. Specifies the function called when the page is loaded. The value returned from this function call will be used as the initial condition of the Slider handle.
Orientation
VALUE="HORIZONTAL"|"VERTICAL"—Specifies if the handle is to travel horizontally or vertically. The orientation parameter will override the orientation determined by the height and width dimensions.
tickLength
VALUE="number"—The length (size) of each tick mark, in pixels. The range is 1-255 (0x01-0xFF). If tickLength is not given, the default is 9 pixels.
tickPosition
VALUE="CENTER"|"TOP"|"BOTTOM"|"LEFT"|"RIGHT"—The position of the tick marks in relation to the channel. The range for a horizontal slider is CENTER, TOP or BOTTOM. The range for a vertical slider is CENTER, LEFT or RIGHT. If tickPosition is not given, the default is CENTER (inside the channel).
waitForInit
VALUE="TRUE"|"FALSE"—Only valid if FromInitHref is used as the initialCondition. Specifies if the Slider handle will wait for valid data before being displayed on the channel. If TRUE, the Slider handle will not display until the data from the initHref function is received. If FALSE, or the attribute is not present, the Slider handle momentarily starts at the minAt location until the initHref function receives its data.
List Parameter Types
FIG. 14 lists the parameters that describe the List widget in one or more embodiments of the present disclosure.
Name
VALUE="text"—Specifies the name List widget.
Width
VALUE="number"—Specifies the width of the List widget.
Height
VALUE="number"—Specifies the height of the List widget.
fillColor
VALUE="color"—Specifies the desired list fill color. If no fill color is specified, the default color is the current background color.
Font
VALUE="font"—Specifies the font used for the option names within the list box. The corresponding .auf file must be included in the Amulet/Color/Color/Configuration/Fonts folder, the root folder, or the root/Fonts folder. Default is Bitstream Vera Sans.
fontColor
VALUE="color"—Specifies the desired font color. If no font color is specified, the default color is black.
fontSize
VALUE="number"—Specifies the font size for the option names within the list box. It can be one of the HTML sizes 1-7 or an actual point size (8 pt-99 pt), such as "9" or "9 pt". Only one value is allowed per list box; you cannot mix font sizes. The assigned HTML values are:

1=8-point font
2=10-point font
3=12-point font
4=14-point font
5=18-point font
6=24-point font
7=36-point font
fontStyle
VALUE="PLAIN"|"BOLD"|"ITALIC"|"UNDERLINE" | "STRIKE"—Specifies the style associated with the list box font. To create a custom look, styles can be combined by using the "logical or" (|). However, PLAIN overrides any other style. The available font styles are:

PLAIN—The option text uses the standard font.
BOLD—The option text is bold. (i.e. text)
ITALIC—The option text is italicized. (i.e. text)
UNDERLINE—The option text is underlined. (i.e. text)
STRIKE—The option text is stricken through. (i.e. text)
Href
VALUE="function(s)"—The function (or multiple/sequenced functions) invoked when a list item is hit.
initialCondition
VALUE="string"|"FromInitHref"—Specifies which option string is highlighted when the page is loaded. The value associated with the highlighted option string is the argument given to the href function(s). If "FromInitHref" is selected, the function specified by the InitHref attribute is called. Whichever option has the same intrinsic value as the returned value from the initHref function will be initially highlighted.
Options
VALUE="string1,string2,string3 (etc.)"—Specifies the list strings. All strings are comma delimited. Note: Any spaces before or after the commas are included in the text string. To specify an intrinsic value, append "=xxx" to the individual titles; (where xxx is a number from 0-65535 (0x00-0xFFFF) or a STRING. The first option displays at the top of the list and each subsequent option displays directly below the previous.
selectionColor
VALUE="color"—Specifies the color of the highlighted entry in the list box. If no selection color is specified, the default color is black.
selectionFontColor
VALUE="color"—Specifies the color of the font within the highlighted entry in the list box. If no selection color is specified, the default color is white.
downArrow
VALUE="image"—Specifies the "page down arrow" image to use when the list has more items than can be viewed. If this attribute is not present, then a default image, downArrow.gif, located in Amulet/Color/Configuration/Widgets/List/, is used. (Images can be either .GIF, .JPG, or .PNG.)
downArrowAlt
VALUE="image"—Specifies the "page down arrow" image to use when the down arrow is selected. If this attribute is not present, then a default image, downArrowAlt.gif, located in Amulet/Color/Configuration/Widgets/List/, is used. (Images can be either .GIF, .JPG, or .PNG.)
initHref
VALUE="function"—Specifies the function called when the page is loaded. Use this attribute whenever FromInitHref is used as the initialCondition. The value returned from this function call will determine which option string starts out highlighted. The value should match the intrinsic value of one of the options strings.
scrollRate
VALUE="seconds"—Specifies the rate at which the list scrolls when selecting the area directly below or above the list box. The default scroll rate is 0.45 seconds. The range is 0.01-655.35.
upArrow
VALUE="image"—Specifies the "page up arrow" image to use when the list has more items than can be viewed. If this attribute is not present, then a default image, upArrow.gif, located in Amulet/Color/Configuration/Widgets/List/, is used. (Images can be either .GIF, .JPG, or .PNG.)
upArrowAlt
VALUE="image"—Specifies the "page up arrow" image to use when the up arrow is selected. If this attribute is not present, then a default image, upArrowAlt.gif, located in Amulet/Color/Configuration/Widgets/List/, is used. (Images can be either .GIF, .JPG, or .PNG.)

What is claimed is:

1. A method for authoring a graphical user interface (GUI), comprising:
providing, using a processor, a widget builder interface for creating a widget;
receiving user input of widget properties for the widget, the inputted widget properties including a widget type, one or more widget parameters, and one or more images; and
saving, using the processor, the inputted widget properties including the one or more images into a widget file conforming to a standard image file format.

2. The method of claim 1, further comprising:
receiving user input selecting a template for creating the widget or setting the widget as a template widget for creating customized widgets.

3. The method of claim 1, wherein the image file is a portable network graphics (PNG) file, the widget type and the one or more widget parameters are saved as comments in a text chunk, and the one or more images are saved in one or more image data chunks.

4. The method of claim 3, wherein the widget type and the one or more widget parameters are saved as XML elements.

5. The method of claim 3, wherein each widget parameter comprises a start tag with a widget parameter name and one or more attributes, an end tag, and one or more widget parameter values between the start and the end tags.

6. The method of claim 5, further comprising:
receiving user input of settings for the one or more widget parameters as editable or not editable; and
saving the settings as attributes in start tags.

7. The method of claim 1, further comprising populating a properties editor in the widget builder interface with widget parameters and widget parameter values from a template widget file.

8. The method of claim 1, where the widget type is selected from a radio button widget, a slider widget, a list widget, a checkbox widget, a button widget, a spinner widget, and a menu widget.

9. The method of claim 1, wherein the one or more widget parameters define a state image comprising one image or multiple image components selected from the one or more images.

10. The method of claim 1, further comprising:
providing a GUI builder interface for building the GUI;
receiving user input selecting the widget file to create a widget in the GUI;
parsing the widget file for the inputted widget properties;

saving the inputted widget properties as part of a project file;

using the inputted widget properties, calling a rendering tool to render the widget as it would appear in a native environment; and displaying the rendered widget in the GUI builder interface.

11. The method of claim 10, wherein the rendering tool comprises a translator and a library wrapper around runtime code of a widget library, and calling a rendering tool comprises:

providing the translator with the widget type and the one or more widget parameters, wherein the translator translates the widget type and the one or more widget parameters into data structures for the library wrapper; and using the data structures, the library wrapper rendering the widget and providing the rendered widget to the GUI builder interface.

12. The method of claim 11, further comprising:

extracting the one or more images from the widget file and converting them into one or more objects in a common class;

creating one or more pointers to the one or more objects; and providing the one or more pointers along with the widget type and the one or more widget parameters to the library wrapper via the translator, wherein the runtime code of the widget library uses a pointer to determine an original size of an image, a rendered size of the image, and a position of the image relative to one or more graphical elements rendered by the rendering tool.

13. The method of claim 11, further comprising:

receiving user input updating one or more widget parameter values;

in response to the updated one or more widget parameter values, calling the rendering tool to re-render the widget; and displaying the re-rendered widget in the GUI builder interface in real-time.

14. The method of claim 10, wherein the rendering tool comprises a translator and a library wrapper around runtime code of a widget library for rendering widgets, the method further comprising:

extracting the one or more images from the widget file into one or more individual image files;

providing the translator with the project file, wherein the translator translates the project file into HTML code; and providing the HTML code and the one or more image files to a compiler, the compiler compiling the HTML code and the one or more image files into µHTML code.

15. The method of claim 14, further comprising:

programming a controller chip with the µHTML code or running the µHTML code on a simulator of a controller chip, wherein the simulator comprises an application wrapper around runtime code of a widget library for rendering widgets.

16. A method for authoring a graphical user interface (GUI), comprising:

providing, using a processor, a GUI builder interface for building the GUI;

receiving user input selecting a widget file to create a widget in the GUI;

parsing the widget file for widget properties, the widget properties including a widget type, one or more widget parameters, and one or more images;

saving the widget properties as part of a project file;

using the widget properties, calling a rendering tool to render the widget as it would appear in a native environment; and displaying the rendered widget in the GUI builder interface.

17. The method of claim 16, wherein the rendering tool comprises a translator and a library wrapper around runtime code of a widget library, and calling a rendering tool comprises:

providing the translator with the widget type and the one or more widget parameters, wherein the translator translates the widget type and the one or more widget parameters into data structures for the library wrapper; and using the data structures, the library wrapper rendering the widget and providing the rendered widget to the GUI builder interface.

18. The method of claim 17, further comprising:

extracting the one or more images from the widget file and converting them into one or more objects in a common class;

creating one or more pointers to the one or more objects; and providing the one or more pointers along with the widget type and the one or more widget parameters to the library wrapper via the translator, wherein the runtime code of the widget library uses a pointer to determine an original size of an image, a rendered size of the image, and a position of the image relative to one or more graphical elements rendered by the rendering tool.

19. The method of claim 18, further comprising:

receiving user input updating one or more widget parameter values;

in response to the updated one or more widget parameter values, calling the rendering tool to re-render the widget; and displaying the re-rendered widget in the GUI builder interface in real-time.

20. The method of claim 16, wherein the rendering tool comprises a translator and a library wrapper around runtime code of a widget library for rendering widgets, the method further comprising:

extracting the one or more images from the widget file into one or more individual image files;

providing the translator with the project file, wherein the translator translates the project file into HTML code; and providing the HTML code and the one or more image files to a compiler, the compiler compiling the HTML code and the one or more image files into µHTML code.

21. The method of claim 20, further comprising:

programming a controller chip with the µHTML code or running the µHTML code on a simulator of a controller chip, wherein the simulator comprises an application wrapper around runtime code of a widget library for rendering widgets.

* * * * *